(12) United States Patent
Fowler, Jr. et al.

(10) Patent No.: US 7,026,627 B2
(45) Date of Patent: Apr. 11, 2006

(54) NEUTRON/GAMMA RAY SURVEY INSTRUMENT WITH DIRECTIONAL GAMMA RAY SENSITIVITY

(75) Inventors: Fred E. Fowler, Jr., Grand Junction, CO (US); Jerry L. Burnham, Grand Junction, CO (US); Robert D. Wilson, Silverton, CO (US)

(73) Assignee: Delta Epsilon Instruments, Delta, CO (US)

( * ) Notice: Subject to any disclaimer, the term of this patent is extended or adjusted under 35 U.S.C. 154(b) by 30 days.

(21) Appl. No.: 10/731,178

(22) Filed: Dec. 9, 2003

(65) Prior Publication Data

US 2005/0121618 A1    Jun. 9, 2005

(51) Int. Cl.
  *G01J 1/42* (2006.01)
  *G01T 1/00* (2006.01)
  *G01T 3/00* (2006.01)

(52) U.S. Cl. ............. 250/394; 250/390.12; 250/391; 250/392

(58) Field of Classification Search ............. 250/256, 250/262, 264–266, 361 R, 362, 366–367, 250/370.05, 370.11, 390.01, 390.11–12, 391–392, 250/394
  See application file for complete search history.

(56) References Cited

U.S. PATENT DOCUMENTS

| 3,581,090 | A | * | 5/1971 | Brown | 250/363.01 |
|---|---|---|---|---|---|
| 4,172,226 | A | * | 10/1979 | Rubin | 250/394 |
| 4,893,017 | A | * | 1/1990 | Kronenberg | 250/370.07 |
| 5,021,652 | A | | 6/1991 | Arnold | |
| 5,200,626 | A | | 4/1993 | Schultz et al. | |
| 5,274,238 | A | * | 12/1993 | Brown | 250/394 |
| 5,345,084 | A | * | 9/1994 | Byrd | 250/390.12 |
| 5,866,907 | A | * | 2/1999 | Drukier et al. | 250/366 |
| 6,300,624 | B1 | | 10/2001 | Yoo et al. | |
| 6,639,210 | B1 | | 10/2003 | Odom et al. | |

OTHER PUBLICATIONS

Fehlau, P.E. "Integrated Neutron/Gamma-ray Portal Monitors for Nuclear Safeguards". IEEE Transactions on Nuclear Science, vol. 41, No. 4 (Aug. 1994), pp. 922-926.*

* cited by examiner

*Primary Examiner*—David Porta
*Assistant Examiner*—Frederick F. Rosenberger
(74) *Attorney, Agent, or Firm*—Law Office of Tim Cook P.C.

(57) ABSTRACT

A portable survey instrument and methodology yield intensity of neutron radiation, intensity of gamma radiation, and a direction of impinging gamma radiation. The instrument uses a neutron detector surrounded by an essentially rectangular moderator with preferably four gamma ray detectors disposed symmetrically about the neutron detector and within the moderator. Material and dimensions of the moderator are selected so that the neutron measurement is equally sensitive to fast and thermal neutrons. The moderator also induces angular responses to the gamma ray detectors. Responses of the gamma ray detectors are combined to yield a parameter indicative of the angular position of a source. The survey instrument is portable and suited for hand held use.

26 Claims, 4 Drawing Sheets

NEUTRON/GAMMA RAY SURVEY INSTRUMENT WITH DIRECTIONAL GAMMA RAY SENSITIVITY

This invention is related to the detection of intensity and direction of impinging radiation, and more particularly related to a portable instrument apparatus and methodology which yields intensity of both neutron and gamma radiation, and which yields a direction of impinging gamma radiation.

BACKGROUND OF THE INVENTION

Portable radiation measurement instruments, commonly referred to as "survey" instruments, are available commercially. Such instruments may also be referred to as "radiac" instruments, where "radiac" is an acronym for radioactive detection, identification, and computation. The term refers to the detection and measurement of the intensity of emitted nuclear radiation. Some of these survey or radiac instruments comprise both neutron and gamma ray detectors thereby responding to both impinging neutron and gamma radiation. Portable survey instruments vary in size from small, pager-size devices that fit on a person's belt to larger instruments that are the size of a suitcase or larger. Capabilities and response characteristics of these survey instruments vary considerably. Some of the larger survey instruments contain sophisticated radiation spectrometer detectors with isotope identification and analysis capability, and are relatively sensitive to impinging radiation. Pager-size survey instruments typically contain small radiation detectors and are relatively insensitive to impinging radiation and lack sophisticated analysis capability. There are intermediate size survey instruments with intermediate radiation sensitivity and intermediate analysis capability. Directional radiation response capabilities are typically obtained with radiation collimators, which add significantly to the size and weight of the survey instrument.

Emphasis on security and antiterrorist activities has renewed interest and intensified the need for radiation survey instrumentation. As an example, radiation survey meters are used to monitor incoming cargo for clandestine radioactive materials or weapons containing radioactive materials. These applications require instrumentation and data processing methodology that can be used to determine the type (e.g. gamma radiation, neutron radiation, or both) and the intensity of detected radiation. In these applications, it is also highly desirable to have a survey instrument with directional capabilities. This allows the user of the instrument to more easily determine the physical location of a source of radiation. Using the above example, a directional survey instrument can assist in locating clandestine radioactive material within a cargo container containing additional, non-radioactive material.

SUMMARY OF THE INVENTION

The present invention comprises a portable a survey instrument and methodology that yields intensity of neutron radiation, intensity of gamma radiation, and a direction of impinging gamma radiation. The instrument and data processing methodology will henceforth be referred to as the survey instrument "system". The physical size of the survey instrument is "intermediate" in that it is smaller than previously mentioned instruments comprising sophisticated radiation spectrometer detectors with isotope identification and analysis capability, yet larger than pager size instruments.

The survey instrument comprises a neutron detector and an array of gamma ray detectors. The neutron detection measures intensity of impinging fast and thermal neutron radiation. The array of gamma ray detectors measures total gamma radiation flux impinging upon the instrument. In addition, data from the array can be processed to yield a direction from which gamma rays are incident upon the survey instrument.

The directional capability aids an operator of the instrument in quickly determining the general location from which the gamma radiation is produced. This capability is applicable to security and antiterrorist activities. As an example, the directional measurement capability can be used to locate a clandestine gamma radiation producing source within a large shipping container of the type carried by cargo ships. Furthermore, radiation sensitivity of the instrument system meets requirements set forth in the recent draft ANSI standards for Homeland Security applications of radiation survey instruments (ANSI N42.33, Draft Standard: Portable Radiation Detection Instrumentation, Aug. 11, 2003, page 8, section 4.2.2 Exposure rate range; page 8, section 4.2.5.1 Exposure rate alarms; page 10, section 4.3.8 Response time requirements for exposure rate monitors; page 15, section 5.3.3 Energy response) and (ANSI N42.34, Draft Standard; Performance Criteria for Hand-Held Instruments for the Detection and Identification of Radionuclides, Aug. 11, 2003; page 8, section 7.3.3 Test Method—Neutron). The above ANSI standards for Homeland Security applications of radiation survey instruments are herein entered into this disclosure by reference.

The survey instrument system is suited for a wide variety of applications other than security and antiterrorist application. These other applications include safety surveys of industrial facilities, medical facilities and other facilities using radioactive materials, surveys of devices such as nuclear reactors, and radiation surveys of the environment for naturally occurring radioactive materials. The directional capability of the gamma ray response is especially useful in locating lost sources that emit gamma radiation in addition to neutron radiation. More specifically, the survey instrument system is suited for locating radiation sources lost from industrial gauging operations, including neutron and gamma ray sources used in borehole logging instruments. The survey instrument system can be used to locate contamination in medical facilities where liquid and other types of radiation sources are used for patient therapy. Liquid sources, in particular, are more prone to contaminate a facility, health care personnel, or a patient than an encapsulated type source.

As mentioned previously, the survey instrument comprises a neutron detector and an array of gamma ray detectors. The neutron detection system is designed to be sensitive to a wide energy range of neutrons. An essentially rectangular moderator block surrounds the neutron detector and provides for good detection sensitivity of the energetic "fast" neutrons in the million electron Volts (MeV) range from sources such as Californium-252 ($^{252}$Cf) and $^{241}$Americium-beryllium ($^{241}$Am—Be). The moderator thickness is such that the detector also responds about equally to the low energy "thermal" neutrons that result from thermalization of fast source neutrons by materials often encountered in the survey environment, such as moisture. The moderator is preferably a material which is rich in hydrogen to moderate fast neutrons, but also has a low cross section for thermal neutron absorption. The neutron detector is disposed axially at the center of the moderator, with the moderator extending over the active length of the neutron detector. The moderator thickness produces sufficient thermalization so that the neutron detector responds with a similar count rate to both thermal and fast neutron sources.

Directional gamma response is achieved by locating preferably four small diameter gamma ray scintillation detectors circumferentially around the neutron detector. In one embodiment, the major axes of the gamma ray detectors are axially aligned with the major axis of the neutron detector. In another embodiment, the major axes of the gamma ray detectors are perpendicular to the major axis of the neutron detector. The detectors are preferably scintillation type, and preferably extend the length of the moderator. Each gamma ray detector preferably comprises a scintillation crystal optically coupled to scintillation sensitive device such as a silicon photodiode. Gamma radiation intensity and directionality are determined by combining responses of the detectors in the array. Briefly, gamma ray intensity is preferably obtained by summing responses of all gamma ray detectors in the array. Gamma ray attenuation in the moderator produces varying relative count rates in the preferably four gamma detectors in the array, depending upon the angular location of the radiation emitting source as measured from a predetermined reference. These variations are used to determine gamma radiation directionality.

BRIEF DESCRIPTION OF THE DRAWINGS

So that the manner in which the above recited features, advantages and objects of the present invention are obtained and can be understood in detail, more particular description of the invention, briefly summarized above, may be had by reference to the embodiments thereof which are illustrated in the appended drawings.

DETAILED DESCRIPTION OF THE PREFERRED EMBODIMENTS

The detailed description of the invention is divided into sections. The first section discloses basic concepts of the survey instrument. The second section discloses preferred data processing methods used to obtain a measure of neutron flux intensity, gamma ray flux intensity, and gamma ray directionality which is related to an azimuthal position of a source. The third section discloses system apparatus in preferred physical embodiments of the survey instrument system.

Basic Concepts

The survey instrument comprises a neutron detector and an array of gamma ray detectors. The neutron detector measures intensity of impinging fast and thermal neutron radiation. The array of gamma ray detectors measures total gamma radiation flux impinging upon the survey instrument. In addition, data from the array is processed to yield a direction from which gamma rays are incident upon the survey instrument.

Neutron Detection

The neutron detector is preferably small and sufficiently rugged to withstand use in a portable survey instrument. In the preferred embodiment, the neutron detector comprises a 1 inch (in.) or 2.54 centimeter (cm) diameter, 6 atmosphere He-3 detector. The neutron detector system is also preferably responsive to a wide range of neutron energies. Finally, the neutron detector system is relatively sensitive to total neutron flux.

Figure 1:
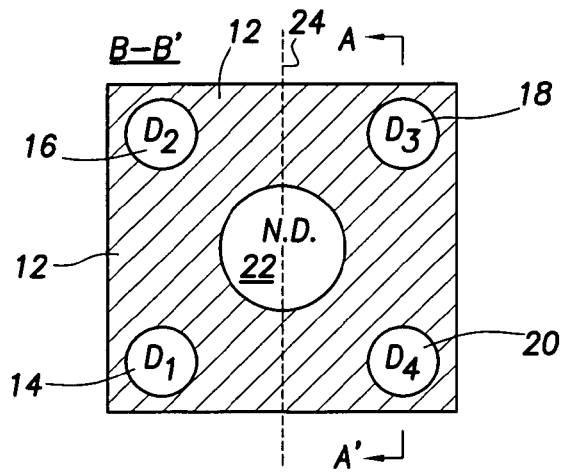
FIG. 1 is a conceptual front sectional view at B–B' of the survey instrument with axes of the gamma ray and neutron detectors aligned.

FIG. 1, which is a conceptual front sectional view at B–B' of one embodiment of the survey instrument, is used to illustrate how the above neutron detection design criteria are met. A moderator 12 surrounds a neutron detector 22. The moderator 12 is a block that is essentially rectangular, although other shapes can be used. The moderator 12 is preferably in the shape of a rectangular block, for reasons that will become apparent in subsequent discussion. The neutron detection system exhibits good sensitivity to energetic "fast" neutrons from sources such as Californium-252 ($^{252}$Cf) and $^{241}$Americium-beryllium ($^{241}$Am—Be). The neutron detection system is also sensitive to low energy neutrons in the thermal energy region. Sensitivity over this broad neutron energy range is a result of the composition and the thickness of the moderator material 12. The moderator preferably has a high hydrogen content to moderate fast neutrons, but also has a low cross section for thermal neutron absorption.

The preferred moderator material is polyethelene, although other materials meeting the hydrogen content and thermal neutron absorption criteria can be used. The moderator thickness is such that the detector also responds well to the low energy neutrons that result from thermalization of fast source neutrons by materials often encountered in the survey environment, such as moisture.

MCNP simulations were used to determine optimum moderator dimensions and geometry for the preferred He-3 neutron detector 22 and polyethylene moderator material 12. A $^{252}$Cf source (unmoderated) was used in the calculations. It was determined that axially disposing the 1 in. (2.54 cm) diameter, 6 atmosphere He-3 detector at the center of a 3 in.×3 in. (7.62 cm) square×4 in. (10.2 cm) long polyethylene moderator block, as shown in FIG. 1, provides the desired neutron detector system response characteristics. More specifically, the polyethylene thickness around the detector 22 produces sufficient thermalization so that the He-3 detector 22 yields a neutron flux response $C_N$ with a similar count rate for both thermal and fast neutron sources. The polyethylene mass density is about 0.92 grams per cubic centimeter ($gm/cm^3$), and the moderator block 12 preferably extends over the active length of the He-3 detector 22, whose position within the moderator block is shown with broken lines in FIG. 2.

Gamma Ray Detection

Figure 2:
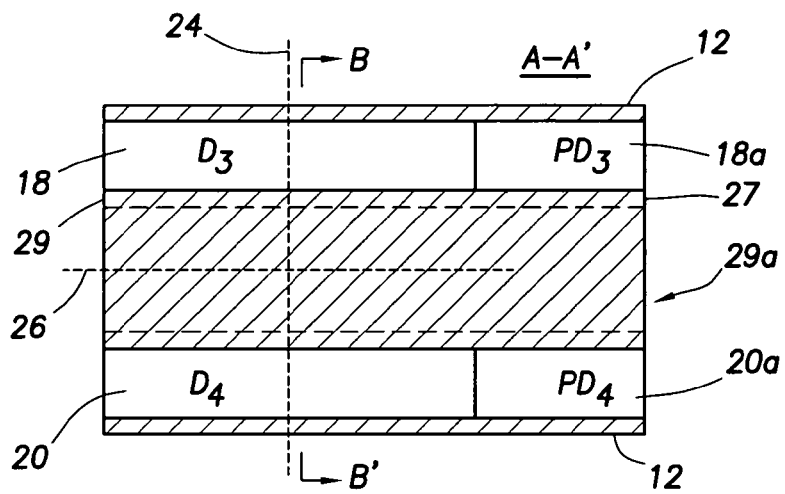
FIG. 2 is a conceptual side sectional view at A–A' of the survey instrument with axes of the gamma ray and neutron detectors aligned.

Attention is directed to FIG. 1, and to FIG. 2 which is a conceptual side sectional view at A–A' of the survey instrument. Directional gamma response is achieved by locating preferably four small diameter gamma ray detectors 14, 16, 18, and 20 symmetrically and circumferentially around the neutron detector 22. In this embodiment, the major axes of the detectors 14, 16, 18, and 20 are parallel to the major axis of the neutron detector 22. As can be seen, the gamma ray detectors 14, 16, 18, and 20 are disposed within the moderator block 12 at the four corners. Each gamma detector preferably comprises a scintillation crystal such as cesium-iodide (CsI) (Tl activated) optically coupled to a light responsive device such as silicon photodiode (PD). It should be understood that other scintillation crystals, such as NaI, and other light responsive devices, such as a photomultiplier tube, can also be used as components of the gamma ray detectors. Each CsI scintillation crystal is preferably 0.5 in. (1.27 cm) in diameter×3 in. (7.62 cm) in length. FIG. 2 is a sectional view through detector crystals 18 and 20 and illustrates the optically coupled photodiodes 18a and 20a, respectively. All four crystal-photodiode assemblies preferably extend the length of the polyethylene moderator block 12. The "front" and "back" of the instrument are defined by the surfaces 29 and 29a, respectively, of the moderator block 12 (see FIGS. 2 and 3).

The criteria for selecting moderator material are not the same for the directional gamma ray measurement. Previously discussed moderator material is selected to optimize the neutron detector response, and this material will also attenuate gamma radiation thereby yielding directional gamma radiation measurements. It should be understood that other moderator material, which is not rich in hydrogen, will also provide sufficient or even superior gamma ray attenuation thereby yielding directional gamma ray measurements.

For purposes of discussion, it should be understood that detectors 14, 16, 18, and 20 preferably include both CsI(Tl) scintillation crystals and optically coupled photodiodes. Gamma radiation intensity and directionality are determined by combining responses of the detectors 14, 16, 18, and 20 in the array. Furthermore, it should be understood that other types of gamma ray detector can be used.

Gamma ray count rate sensed by each of the four detectors in the array is defined as $C_{G,i}$, where (i=1, 2, 3, 4). Total gamma ray response of the survey instrument, $C_G$, is obtained by summing the count rates of the array detectors. Stated mathematically, $$C_G = \Sigma(C_{G,i}) (i=1, \ldots, 4) \quad (1)$$

Figure 3:
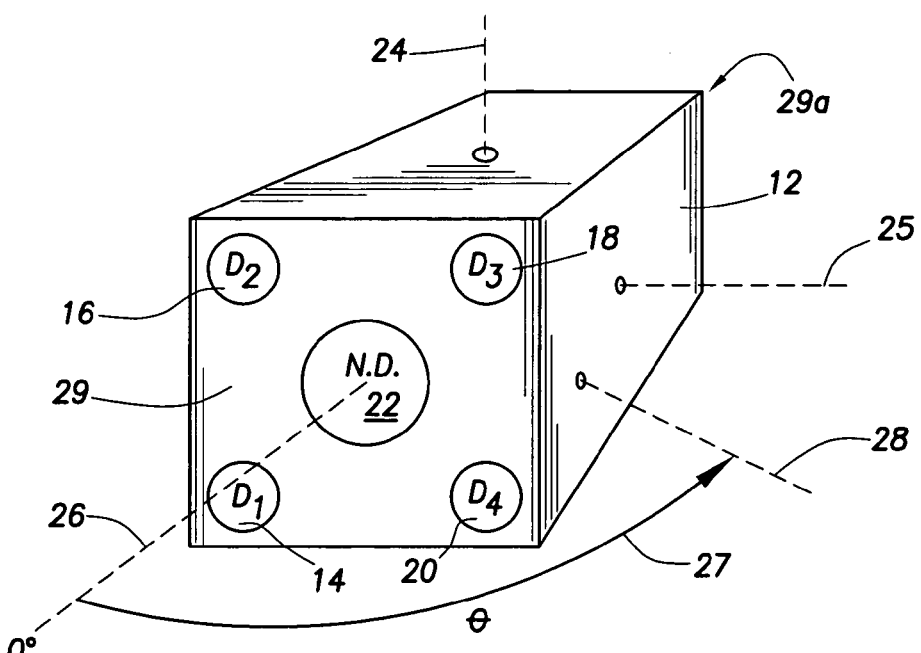
FIG. 3 is a conceptual perspective view of the survey instrument instrument with axes of the gamma ray and neutron detectors aligned.

Gamma ray attenuation in the polyethylene moderator block produces varying relative count rates $C_{G,i}$ in the four gamma detectors 14, 16, 18 and 20, depending upon the angular location of the gamma ray source. For purposes of discussion, the detectors will be referred to as $D_i$, with i=1, 2, 3, 4 defining detectors $D_1$, $D_2$, $D_3$, $D_4$, respectively, as shown in FIGS. 1 and 2. FIG. 3 is a conceptual perspective view of the survey instrument embodied with major axes of the gamma ray detectors and neutron detectors parallel. Horizontal axis 26 is coincident with the axis of the the neutron detector 22. Vertical axis 24 is perpendicular to the axis 26, and also passes through the major axis of the neutron detector 22 at a point that bisects the lengths of the crystals of the array of detectors $D_i$. The defining positions of the axes 24 and 26 can be better seen in FIGS. 1 and 2. Vector 28 is in a plane that is perpendicular to axis 24 and includes the major axis of the neutron detector 22. This plane will be referred to as the "horizontal" plane. Axis 26 and the vector 28 define an angle θ which is the azimuthal location of a gamma ray emitting source, in the horizontal plane, with respect to a reference defined as the front surface 29 of the survey instrument. It should be understood that other references can be defined, and that azimuthal location can be determined with respect to any of these references. These references can be located at other positions on the survey instruments, or can be external to the survey instrument such as a compass direction.

For the embodiment shown in FIGS. 1–3, the count rates $C_{G,i}$ from the gamma ray detectors i=1, ..., 4 are combined with total gamma ray count rate $C_G$, as defined by equation 1, to determine θ. A ratio R is defined as $$R = (C_{G,1} + C_{G,2})/(C_{G,3} + C_{G,4}). \quad (2)$$

Figure 4:
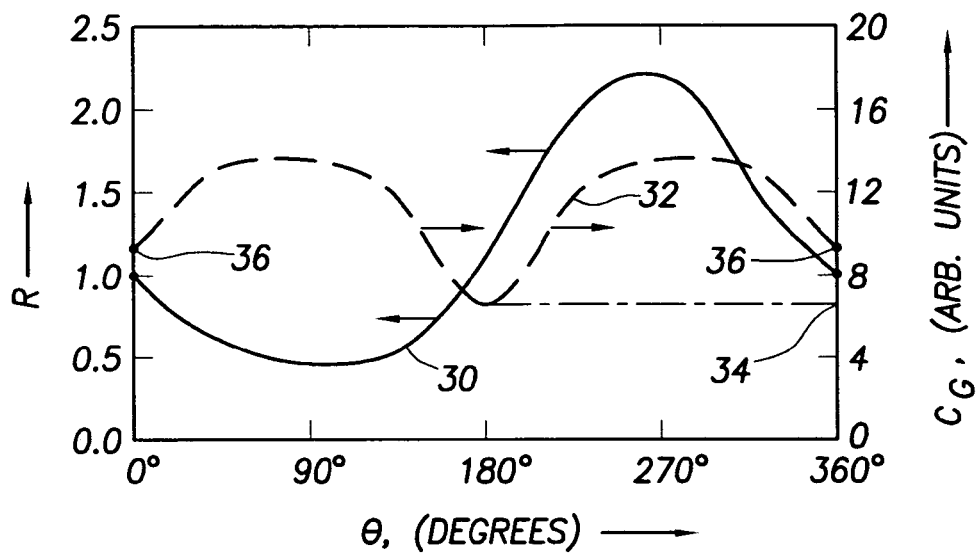
FIG. 4 shows the total gamma ray count rate and azimuthal sensitivity as a function of azimuth angle θ of the instrument, with axes of the gamma ray and neutron detectors aligned.

FIG. 4 shows variation of R as a function of θ, in degrees (°), as a solid curve 30. At θ=0° and 180°, R=1.0 or "unity". This means that if the survey instrument yields a reading R=1.0, then the location of the source is either directly in "front" of the instrument reference surface 29 (e.g. θ=0° or 360°) or in "back" of the instrument surface 29a (e.g. θ=180°). Stated another way, the azimuthal location of the source can not be determined uniquely using only the ratio R. The situation is resolved by using the total gamma ray count rate (right hand abscissa), $C_G$, which is also shown as a function of θ in FIG. 4 as a broken curve 32. Count rate is shown in arbitrary units (arbs). At θ=0° or 360° (the front of the instrument), $C_G$=9.18 arbs as indicated at 36. At θ=180° (the back of the instrument), $C_G$=6.84 arbs as indicated at 34. $C_G$ is a function of source strength and distance of the source from the instrument. These values are typically unknown. A single value of $C_G$ can not, therefore, be combined directly with individual count rates to uniquely determine θ. The higher count rate will, however, be observed when the source is in front of the instrument (θ=0°). This azimuthal location is reflected in a ratio $C_G(\theta=0°)/C_G(\theta=180°)$ that is greater than 1.0. The ratio is independent of source strength and distance of the source from the instrument, and is equal to 1.32 in the example shown in FIG. 4.

To summarize, a first total count rate reading is noted with the instrument in an initial position in which R=1.0 is measured. The instrument is then rotated 180 degrees about the axis 24 to a reverse position and a second total count rate reading is noted. If the first total count rate is larger than the second total count rate, then the source is located directly in front of the instrument in the initial position. If the first total count rate is smaller than the second total count rate, then the source is located directly in back of the instrument in the reverse position. Two measures of total gamma ray count rate $C_G(\theta=0°)$ and $C_G(\theta=180°)$ are, therefore, combined with individual detector count rates $C_{G,i}$ to indicate uniquely the location with respect to an azimuthal reference on the survey instrument, which is preferably the "front" face.

It should be noted that alternate methods can be used to determine the ratio R. As an example, R can be defined as $$R = (C_{G,1} \times C_{G,2})/(C_{G,3} \times C_{G,4}). \quad (3)$$

Response of the survey instrument system would be similar to that with R as defined in equation (2). It should also be noted that the number of gamma ray detectors is not limited to four. As an example, a fifth detector $D_5$ could be disposed in the moderator block between detectors $D_1$ and $D_2$, and a sixth detector could be disposed between detectors $D_3$ and $D_4$. With this detector array, the ratio R could be defined as $$R=(C_{G,1}+C_{G,2}+C_{G,5})/(C_{G,3}+C_{G,4}+C_{G,6}) \quad (4)$$

and total count rate would be $$C_G=\Sigma(C_{G,i}) \ (i=1,\ldots,6). \quad (5)$$

Response of the survey instrument system would be similar to that with R as defined in equation (2) for a four gamma ray detector array.

With the embodiment shown in FIGS. 1–3, alternate methods can be used to determine whether the source is directly in front of the survey instrument, or at the back of the instrument. The direction in which R=1.0 is first determined. The instrument is then rotated from this initial position in a direction of increasing θ. The quantity dR/dθ, which is the change of R with respect to θ, is noted. As can be seen in FIG. 4, if R decreases, then the source is directly in front of the survey instrument in the initial position. If R increases, the the source is directly behind the survey instrument in the initial position.

There is also angular sensitivity in any plane that intersects the "horizontal" plane. The survey instrument can be rotated about the axis 26 into a plane different from the horizontal plane, and subsequently rotated about the orthogonal axis 24 until a value of R=1.0 is found. The instrument is then rotated 180° about the axis 24 to determine, using total gamma ray count rate $C_G$ as discussed previously, whether the source is in front or in back of the instrument. It will be shown below that the instrument, with a different configuration of the gamma ray detectors, can be rotated about the axis 24, and the observed ratio R will uniquely locate a source in a plane containing axes 26 and 28.

Figure 5:
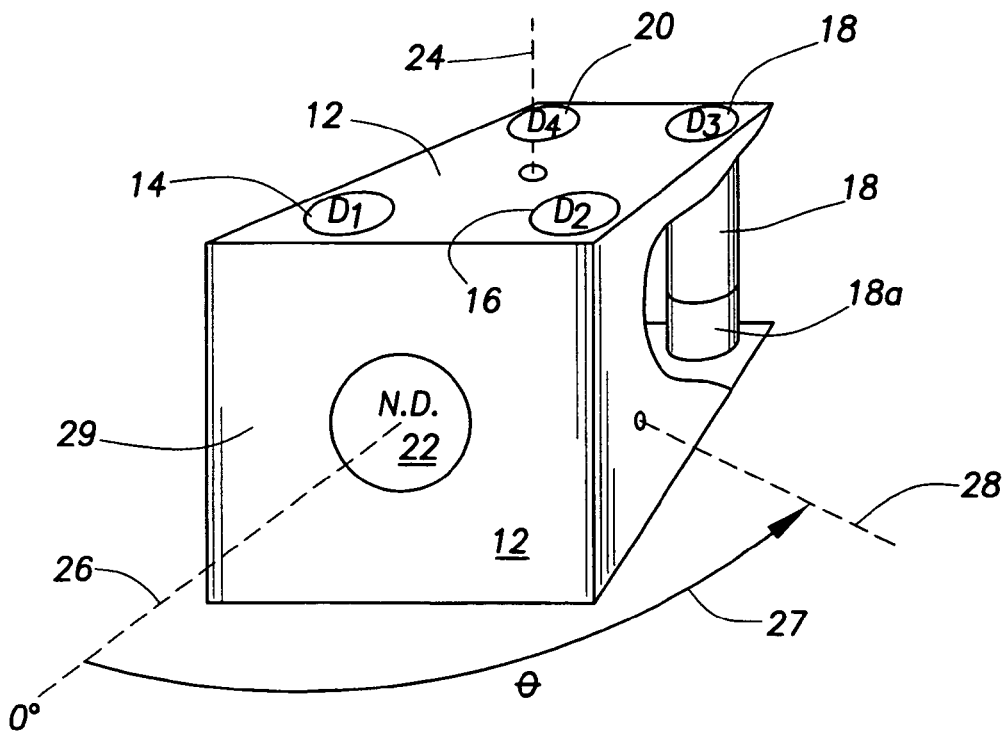
FIG. 5 is a conceptual perspective view of the survey instrument with axes of the gamma ray detectors perpendicular to the axis of the neutron detector.

FIG. 5 illustrates an alternate embodiment of the survey instrument in which major axes of the gamma ray detectors $D_i$ are perpendicular to the major axis of the neutron detector 22. The detectors Di are disposed within the moderator 12 at the corners as shown. All detectors are oriented with the scintillator component 18 of the detector "up" and the light responsive photodiode element 18a "down", as illustrated in the cutaway view of 18 and 18a at detector $D_3$. Horizontal axis 26 is again coincident with the axis of the the neutron detector 22. Vertical axis 24 is perpendicular to the axis 26, and passes through the major axis of the neutron detector 22 at a point which bisects the length of the neutron detector. Vector 28 is again in the "horizontal" plane which is perpendicular to axis 24 and includes the major axis of the neutron detector 22. The axis 26 and the vector 28 again define an angle θ that is the azimuthal location of a gamma ray emitting source, in the horizontal plane, with respect to a reference defined as the front surface 29 of the survey instrument.

Figure 6:
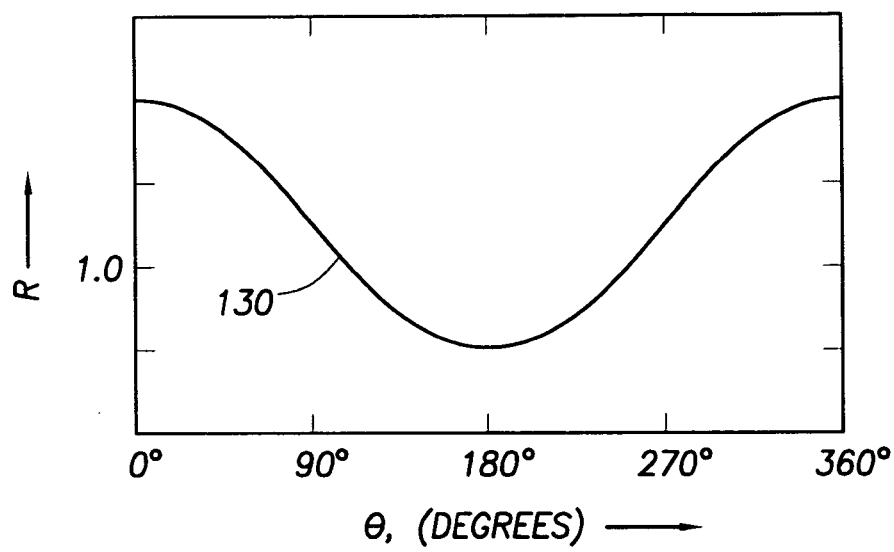
FIG. 6 is a conceptual illustration of the total gamma ray count rate and azimuthal sensitivity as a function of azimuthal angle θ of the instrument, with axes of the gamma ray detectors perpendicular to the axis of the neutron detector.

Responses of the detectors $D_i(i=1,\ldots,4)$ are again combined to obtain a ratio R, preferably as defined in equation (2). This ratio R, plotted as a function of θ, is shown conceptually as curve 130 in FIG. 6. Note that R is a maximum only when a source is in front of the instrument (θ=0°), is unity at θ=90° and θ=270°, and a minimum at θ=180°. FIG. 6 illustrates graphically that with the gamma ray detector configured as shown in FIG. 5, total count rate $C_G$ is not needed to uniquely determine the aximuthal direction of the source in the horizontal plane. The instrument is rotated about the axis 24 until a maximum R reading is observed. The front surface 29, previously defined as the reference, is then pointing toward the source.

Still referring to FIG. 5, it should be noted that if the source is in a plane perpendicular to the horizontal plane, then the source-gamma ray detector configuration is equivalent to that discussed above and shown in FIGS. 1–3. The ratio determined with equation (2), or alternately equation (3), will be R=1.0 with the source both "above" and "below" the instrument as oriented in FIG. 5. To determine uniquely the position of the source, both R and $C_G$ (see FIG. 4) must be combined using methodology discussed in detail above.

Data Processing

Figure 7:
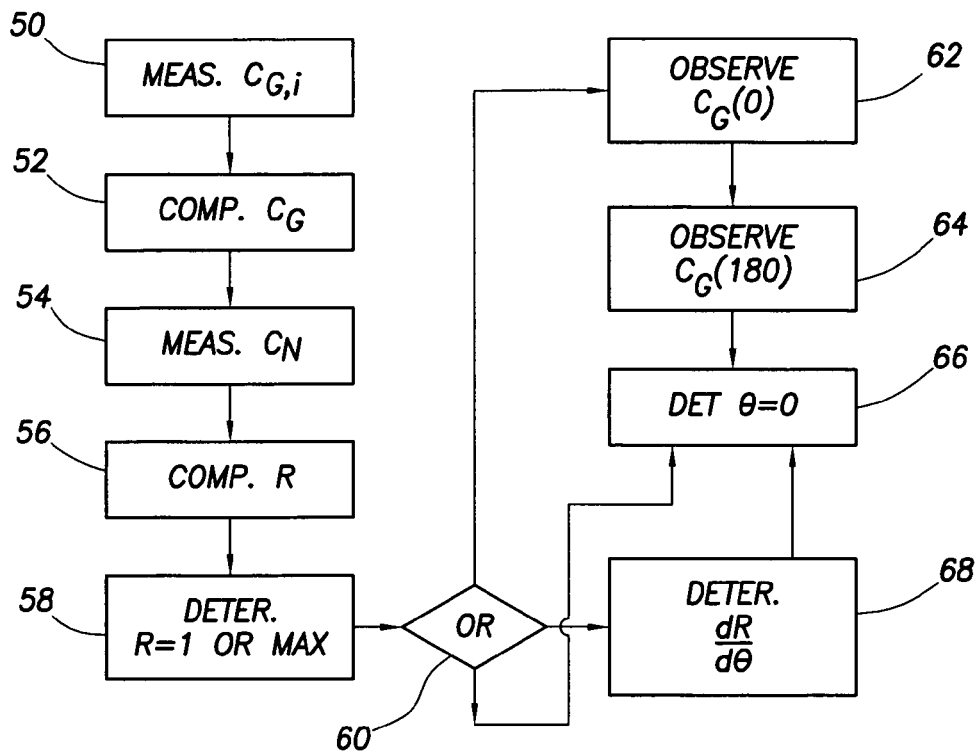
FIG. 7 is a conceptual flow chart illustrating data processing methodology employed by the survey instrument system.

FIG. 7 is a conceptual flow chart illustrating previously discussed methodology employed by the survey instrument system. Count rates $C_{G,i}$ for each of the i gamma ray detectors are measured at 50. It will be assumed for purposes of discussion that the preferred four gamma ray detector array is used. Total gamma ray response, $C_G$, is computed at 52 using equation (1). The response of the neutron detector $C_N$ is measured at 54. A ratio R is computed at 56 from measured values of $C_{G,i}$ using preferably equation (2) or, alternately, equation (3). At 58, the instrument orientation is found such that R=1.0 for gamma ray detectors oriented as shown in FIGS. 1–3, or R is maximized for gamma ray detectors oriented as shown in FIG. 5. Choices are made at 60 depending upon the orientation of the gamma ray detector array in the moderator block. If the gamma ray detectors are oriented as shown in FIGS. 1–3 and it has been determined that the source is in the horizontal plane, then $C_G(\theta=0°)$ and $C_G(\theta=180°)$ are determined as discussed above at 62 and 64, respectively. These values of $C_G(\theta=0°)$ and $C_G(\theta=180°)$ are then compared to determine at 66 if the source is in front or at the back of the initial instrument position, as discussed above. If the gamma ray detectors are oriented as shown in FIG. 5 and it has been determined that the source is in the horizontal plane, then a maximum value of R uniquely determines the azimuthal position of the source, and data processing proceeds directly through 60 to 66.

It should be understood that the methodology shown in FIG. 7 can be modified and still yield parameters of interest (neutron radiation intensity, gamma radiation intensity, and azimuthal source direction) from the measured quantities $C_N$, $C_G$, and $C_{G,i}$.

Apparatus

Figure 8:
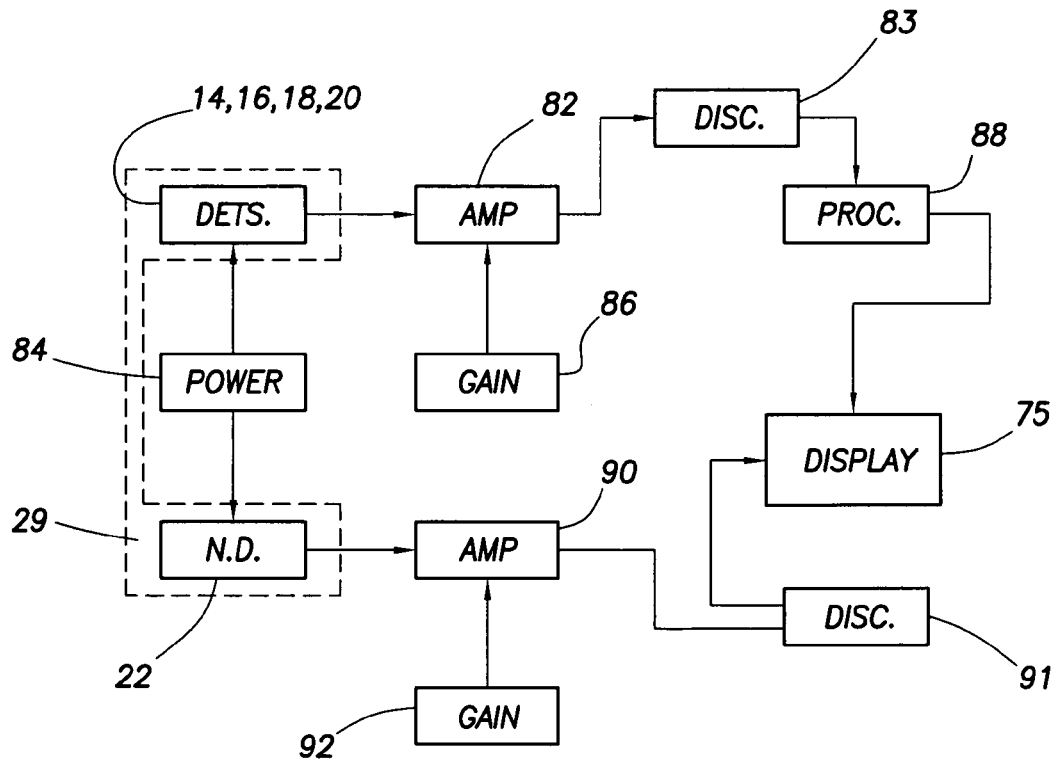
FIG. 8 is a functional diagram of key elements of the survey instrument system.

FIG. 8 is a functional diagram of key elements of the survey instrument system. Outputs from the photodiodes of the preferred four gamma ray detectors 14, 16, 18, and 20 are operationally connected to preamplifiers and to linear amplifiers that produce a standard pulse shape for each detector. Preamplification and amplification for all detectors is shown conceptually as a whole at 82. Outputs from the linear amplifier are input into a discriminator 83 to eliminate electronic noise. Gamma ray detectors are calibrated using a gain control 86 operationally connected to the amplification circuitry 82. Gamma ray detectors, as well as associated amplification, discrimination and control electronics, are powered by a power source 84 such as a battery.

Still referring to FIG. 8, output from the neutron detector is amplified at 90 and discriminated at 91, with amplification gain being controlled at 92. Discriminated signals from the gamma ray detectors 14, 16, 18, and 20 and the neutron detector 22 are input into a processor 88 in which the measured data $C_{G,i}$ and $C_N$ are combined as previously discussed to yield the computed parameters $C_G$, R, and $C_N$. The processor 88 is operationally connected to a display 75 so that a user of the instrument system can easily read the parameters of $C_{G,i}$, $C_G$, and $C_N$. Optionally, the discriminators 83 and 91 can also be operationally connected to the display 75 so that "raw" neutron and gamma ray detector output can be observed.

Again referring to FIG. 8, the dashed lines illustrate conceptually the moderator in which the neutron detector 22 and the gamma ray detectors 14, 16, 18, and 20 are disposed.

Figure 9:
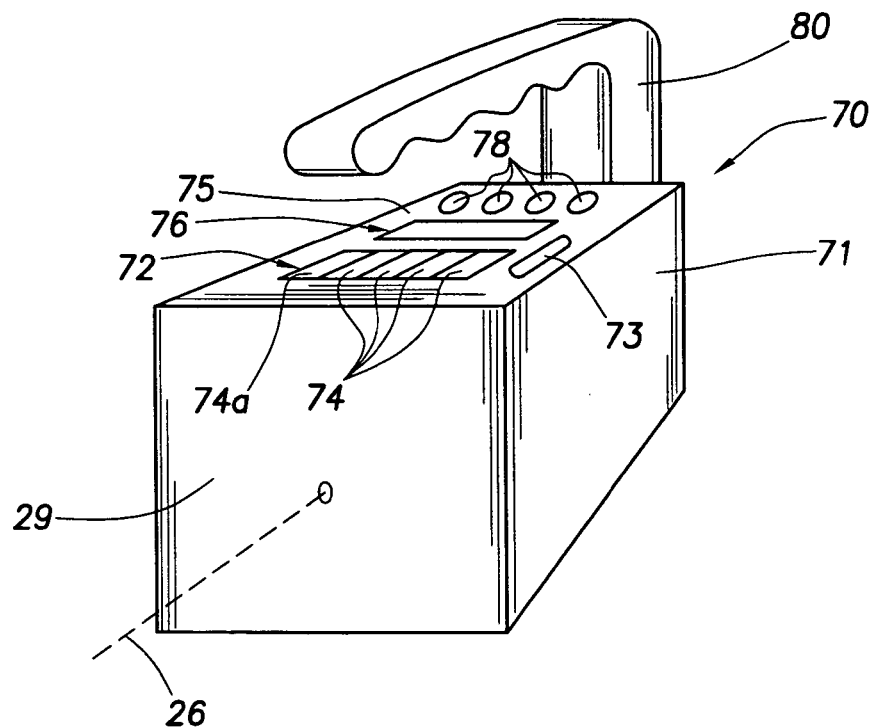
FIG. 9 illustrates the monitor survey system in a typical package.

FIG. 9 illustrates the monitor survey system in a typical package 70. Major elements of the instrument shown in FIG. 8 are fitted within an instrument case 71, which is easily carried in one hand by means of a handle 80. The instrument case is preferably about twice the volume of the moderator-detectors assembly (see FIGS. 3 and 5) to allow room for other elements of the system shown conceptually in FIG. 8. The display 75 includes a digital or analog meter 76 indicating measured neutron count rate $C_N$. A second analog or digital meter 72 indicates total measured gamma ray count rate $C_G$ in a first field at 74a. The gamma ray count rates $C_{G,i}$ measured by each gamma ray detector are optionally displayed in additional fields 74 of the display 72. The ratio R, discussed in detail in previous sections, is also displayed in a field 74 of the display 72. Computations of these parameters of interest are performed in the processor 88 (see FIG. 8). Elements 78 are visual alarms that are preferably activated if measured neutron radiation, gamma radiation, or both types of radiation exceed predetermined levels. The visual alarms can be accompanied by audio alarms via a speaker 73 on the display 75. The surface 29 is defined again as the meter reference, with the axis 26 again being perpendicular to the surface 29.

It should be understood that displays, alarms, and the general configuration of the instrument package can be changed without altering the basic operation of the survey instrument system as disclosed in previous sections.

The present invention can be practiced by other than the described embodiments, which are presented for purposes of illustration and not limitation, and the present invention is limited only by the claims that follow.

We claim:

1. A survey instrument comprising:
   (a) a moderator;
   (b) a neutron detector, wherein:
      (i) said moderator is substantially rectangular, and
      (ii) dimensions of said moderator and material of said moderator and position of said neutron detector within said moderator are selected so that said neutron detector exhibits a neutron response that is about the same for fast and thermal neutrons;
   (c) at least four gamma ray detectors wherein
      (i) each gamma ray detector comprises a scintillator and a light collecting device optically coupled to said scintillator, and
      (ii) said gamma ray detectors are disposed within said moderator symmetrically around said neutron detector and with each at a corner of said moderator; and
   (d) a processor in which gamma ray responses from said gamma ray detectors are combined to yield
      (i) intensity of gamma radiation impinging upon said survey instrument from a source, and
      (ii) an indication of azimuthal direction of said source with respect to a reference on said survey instrument, wherein;
   (e) said indication of azimuthal direction comprises a ratio of responses of pairs of said gamma ray detectors;
   (f) intensity of gamma radiation comprises a sum of said responses of said gamma ray detectors;
   (g) major axes of said gamma ray detectors are parallel to the major axes of said neutron detector; and
   (h) said ratio and said sum are used to determine said azimuthal direction.

2. The instrument of claim 1 further comprising a display on which said neutron response, said intensity of gamma radiation, and said ratio are displayed.

3. The instrument of claim 1 wherein said neutron detector comprises a helium-3 detector.

4. The instrument of claim 1 wherein said scintillator comprises cesium iodide and said light collecting device is a photodiode.

5. The instrument of claim 1 wherein said moderator comprises polyethylene.

6. The instrument of claim 1 wherein said instrument is hand held.

7. The instrument of claim 1 further comprising an alarm that is activated if said intensity of gamma radiation exceeds a predetermined level.

8. The instrument of claim 7 wherein said alarm is an audio alarm.

9. The instrument of claim 1 further comprising an alarm that is activated if said neutron detector response exceeds a predetermined level.

10. The instrument of claim 9 wherein said alarm is an audio alarm.

11. A survey instrument comprising:
   (a) a moderator;
   (b) a neutron detector, wherein:
      (i) said moderator is substantially rectangular, and
      (ii) dimensions of said moderator and material of said moderator and position of said neutron detector within said moderator are selected so that said neutron detector exhibits a neutron response that is about the same for fast and thermal neutrons;
   (c) at least four gamma ray detectors wherein
      (i) each gamma ray detector comprises a scintillator and a light collecting device optically coupled to said scintillator, and
      (ii) said gamma ray detectors are disposed within said moderator symmetrically around said neutron detector and with each at a corner of said moderator; and
   (d) a processor in which gamma ray responses from said gamma ray detectors are combined to yield
      (i) intensity of gamma radiation impinging upon said survey instrument from a source, and
      (ii) an indication of azimuthal direction of said source with respect to a reference on said survey instrument, wherein;
   (e) said indication of azimuthal direction comprises a ratio of responses of pairs of said gamma ray detectors;
   (f) intensity of gamma radiation comprises a sum of said responses of said gamma ray detectors
   (g) major axes of said gamma ray detectors are perpendicular to the major axes of said neutron detector; and
   (h) said ratio is used to determine said azimuthal direction.

12. The instrument of claim 11 further comprising a display on which said neutron response, said intensity of gamma radiation, and said ratio are displayed.

13. The instrument of claim 11 wherein said neutron detector comprises a helium-3 detector.

14. The instrument of claim 11 wherein said scintillator comprises cesium iodide and said light collecting device is a photodiode.

15. The instrument of claim 11 wherein said moderator comprises polyethylene.

16. The instrument of claim 11 wherein said instrument is hand held.

17. The instrument of claim 11 further comprising an alarm that is activated if said intensity of gamma radiation exceeds a predetermined level.

18. The instrument of claim 11 further comprising an alarm that is activated if said neutron detector response exceeds a predetermined level.

19. A method for measuring radiation with a survey instrument, the method comprising the steps of:
    (a) providing a moderator that is substantially rectangular;
    (b) providing a neutron detector;
    (c) dimensioning said moderator and selecting material of said moderator and positioning said neutron detector within said moderator so that said neutron detector exhibits a neutron response that is about the same for fast and thermal neutrons;
    (d) providing at least four gamma ray detectors wherein each said gamma ray detector comprises a scintillator and a light collecting device optically coupled to said scintillator;
    (e) disposing said gamma ray detectors within said moderator symmetrically around said neutron detector and with each at a corner of said moderator; and
    (f) combining gamma ray responses from said gamma ray detectors to yield
        (i) intensity of gamma radiation impinging upon said survey instrument from a source, and
        (ii) an indication of azimuthal direction of said source with respect to a reference on said survey instrument;
    (g) forming a ratio of responses of pairs of said gamma ray detectors to obtain said indication of azimuthal direction;
    (h) summing responses of said gamma ray detectors to obtain said intensity of gamma radiation;
    (i) aligning major axes of said gamma ray detectors so that they are parallel to the major axes of said neutron detector; and
    (j) using said ratio and said intensity of gamma radiation to determine said azimuthal direction.

20. The method of claim 19 comprising the additional steps of:
    (a) orienting said survey instrument in a first position so that said ratio is unity;
    (b) observing a first gamma radiation intensity with said survey instrument in said first position;
    (c) rotating said survey instrument 180 degrees to a second position so that said ratio is again unity;
    (d) observing a second gamma radiation intensity with said survey instrument in said second position; and
    (e) using said first and said second gamma radiation intensities to uniquely determine said azimuthal direction of said source relative to a reference surface of said survey instrument in said first position.

21. The method of claim 19 comprising the additional step of activating an alarm if said intensity of gamma radiation exceeds a predetermined level.

22. The method of claim 19 comprising the additional step of activating an alarm if said neutron detector response exceeds a predetermined level.

23. A method for measuring radiation with a survey instrument, the method comprising the steps of:
    (a) providing a moderator that is substantially rectangular;
    (b) providing a neutron detector;
    (c) dimensioning said moderator and selecting material of said moderator and positioning said neutron detector within said moderator so that said neutron detector exhibits a neutron response that is about the same for fast and thermal neutrons;
    (d) providing at least four gamma ray detectors wherein each said gamma ray detector comprises a scintillator and a light collecting device optically coupled to said scintillator;
    (e) disposing said gamma ray detectors within said moderator symmetrically around said neutron detector and with each at a corner of said moderator; and
    (f) combining gamma ray responses from said gamma ray detectors to yield
        (i) intensity of gamma radiation impinging upon said survey instrument from a source, and
        (ii) an indication of azimuthal direction of said source with respect to a reference on said survey instrument;
    (g) forming a ratio of responses of pairs of said gamma ray detectors to obtain said indication of azimuthal direction;
    (h) summing responses of said gamma ray detectors to obtain said intensity of gamma radiation;
    (i) aligning major axes of said gamma ray detectors so that they are perpendicular to the major axes of said neutron detector; and
    (j) using said ratio to determine said azimuthal direction.

24. The method of claim 23 comprising the additional steps of:
    (a) orienting the survey instrument in a position so that the ratio is unity; and
    (e) uniquely determining the azimuthal direction of the source relative to a reference surface of said survey instrument.

25. The method of claim 23 comprising the additional step of activating an alarm if said intensity of gamma radiation exceeds a predetermined level.

26. The method of claim 23 comprising the additional step of activating an alarm if said neutron detector response exceeds a predetermined level.

* * * * *